US005549027A

United States Patent [19]

Steinberger et al.

[11] Patent Number: 5,549,027

[45] Date of Patent: Aug. 27, 1996

[54] STRINGED ACOUSTIC MUSICAL INSTRUMENT

[76] Inventors: Richard N. Steinberger, 12 Rudy Rd., New Windsor, N.Y. 12553; Stephen H. Grimes, 755-G Kamehameiki Rd., Kula, Hi. 96790

[21] Appl. No.: 179,432

[22] Filed: Jan. 10, 1994

[51] Int. Cl.$^6$ .......... G01D 3/00

[52] U.S. Cl. .......... 84/297 R; 84/298; 84/299; 84/307

[58] Field of Search .......... 84/297 R, 298, 84/299, 307, 309, 314 N

[56] References Cited

U.S. PATENT DOCUMENTS

| | | | |
|---|---|---|---|
| 14,378 | 3/1856 | Tilton | 84/299 |
| 294,832 | 3/1884 | Wichard | 84/285 |
| 454,905 | 6/1891 | Geiger | 84/299 |
| 466,501 | 1/1892 | Lyon | 84/294 |
| 478,933 | 7/1892 | Henning | 84/293 |
| 516,717 | 3/1894 | Anderberg | 84/293 |
| 538,679 | 5/1895 | Howe | 84/299 |
| 601,071 | 3/1898 | Borcur | 84/298 |
| 608,279 | 8/1898 | Benson | 84/293 |
| 621,700 | 3/1899 | Olson | 84/298 |
| 738,811 | 9/1903 | Johnson | 84/268 |
| 976,428 | 11/1910 | Benson et al. | 84/298 |
| 1,010,240 | 11/1911 | Degulio | 84/294 |
| 1,754,263 | 4/1930 | Claiborne | 84/274 |
| 1,764,679 | 6/1930 | Gast | 84/298 |
| 1,768,261 | 6/1930 | Larson | 84/291 |
| 1,889,408 | 11/1932 | Larson | 84/293 |
| 2,614,448 | 10/1952 | Maccaferri | 84/298 |
| 2,737,842 | 3/1956 | Polfuss | 84/299 |
| 2,793,556 | 5/1957 | Maccaferri | 84/267 |
| 3,072,007 | 1/1963 | Burke | 84/267 |
| 3,302,507 | 2/1967 | Fender | 84/267 |
| 3,353,433 | 11/1967 | Webster | 84/299 |
| 3,538,807 | 11/1970 | Francis | 84/267 |
| 3,563,126 | 2/1971 | Connington | 84/298 |
| 3,858,480 | 1/1975 | Schneider et al. | 84/1.16 |
| 4,044,644 | 8/1977 | Mussulman | 84/314 N |
| 4,084,476 | 4/1978 | Rickard | 84/293 |
| 4,126,073 | 11/1978 | Takabayashi | 84/293 |
| 4,228,715 | 10/1980 | Nourney | 84/307 |
| 4,335,641 | 6/1982 | Höpf | 84/297 R |
| 4,411,186 | 10/1983 | Faivre | 84/291 |
| 4,656,915 | 4/1987 | Osuga | 84/297 R |
| 4,768,415 | 9/1988 | Gressett, Jr. et al. | 84/298 |
| 5,025,695 | 6/1991 | Viel | 84/293 |

OTHER PUBLICATIONS

Pp. 33–48 of "The Guitar Handbook", published 1982 (no month).

*Primary Examiner*—Michael L. Gellner
*Assistant Examiner*—Eddie C. Lee
*Attorney, Agent, or Firm*—Dougherty, Hessin, Beavers & Gilbert

[57] ABSTRACT

A stringed musical instrument, such as a guitar, which includes a bridge which does not stress the top of the guitar either vertically or laterally. Vertical and lateral forces due to string tension are balanced out within the bridge assembly. Also disclosed is an adjustable height tailpiece and means for adjusting the intonation of the instrument by adjusting the distance that the neck projects out of the body.

19 Claims, 2 Drawing Sheets

STRINGED ACOUSTIC MUSICAL INSTRUMENT

BACKGROUND OF THE INVENTION

In order to illustrate the principles of the present invention, it is described herein in connection with an acoustic guitar, but it will be understood that the principles disclosed are applicable to other stringed acoustic instruments as, for example, mandolins etc..

The modern acoustic guitar has been in use for many years, relatively unchanged. Even though the traditional design of guitars is generally satisfactory, there are several deficiencies which persist uncorrected. One of these is that the guitar top requires substantial bracing to resist the downward and lateral forces resulting from string tension acting on the top of the bridge and on the tailpiece. (Note, as convenient nomenclature, the terms "downward" and "vertical" are used to denote a direction normal to the surface of the guitar top, and "lateral" is used to denote a direction parallel to the top surface.)

Another deficiency in conventional prior art guitars is the lack of intonation and action adjustments. It is often desirable to make changes in these parameters after manufacture of the instrument is completed, but this is not possible in prior art instruments.

One object of the present invention, therefore, is to provide a "stress free" bridge system which does not have the downward and lateral forces on the instrument top due to string tension.

Another object of the present invention is to provide convenient intonation and action adjustments for a stringed musical instrument.

SUMMARY OF THE INVENTION

In order to achieve intimate contact between the strings of an acoustic guitar and the bridge, the top of the bridge in prior art guitars is not placed in line with the front and rear string anchors, but rather, is raised somewhat. The strings therefore press down on the bridge achieving the desired intimate contact. However, the bridge then presses down on the guitar top, resulting in an undesired force on the top, which must be resisted by bracing. In addition, the rear anchor for the strings on most guitars is fastened to the guitar top itself, which results in an undesired lateral force on the top. Means are provided in the present invention for avoiding such lateral forces.

In the present invention, outside of the bridge assembly itself, the strings extend in a straight line (at least in the vertical direction) between the front and rear string anchors. With this construction, there is no resultant force pressing the bridge assembly to the guitar top. The desired intimate contact between the strings and the bridge is achieved in the same manner as in the prior art, i.e., by causing the strings to change direction at the point of connection between the strings and the bridge saddle. However, the forces created by this change in direction of the strings are resisted within the bridge assembly itself instead of being resisted by the top of the guitar as in the prior art. The change in direction of the strings can be either vertical (perpendicular to the top surface of the guitar), lateral (parallel to the top surface of the guitar), or in any arbitrary direction. Whatever is the path of the strings through the bridge assembly, the point of exit of the strings from the rear of the bridge assembly is made to be the same distance from the bottom surface of the bridge assembly as is the point of entry of the strings at the front of the bridge assembly. In those embodiments where the strings exit the bridge assembly at a different horizontal position (which would result in a lateral force or couple on the instrument top), it is preferred that the strings be paired, the lateral forces or couples resulting from the strings in each pair cancelling each other.

Action, by which is meant the distance between the strings and the fingerboard of the guitar, is adjusted by tilting the neck of the guitar with respect to the guitar body. In the presently preferred embodiment of the invention, a neck which extends through the body and terminates near the tail of the guitar is used, and the neck is tilted about an axis near the front of the guitar where the neck joins the body. The adjustment is accomplished by inserting an appropriate shim between the neck extension and a fixed block at the tail. Intonation changes, changes which result from changes in the lengths of the strings, may be made by adjusting the amount the neck projects from the instrument, using a set screw bearing against the end of the neck extension at the tail of the guitar.

BRIEF DESCRIPTION OF THE DRAWINGS

FIGS. 7 and 8 are sectioned for clarity.

DETAILED DESCRIPTION OF THE INVENTION

Figure 1:
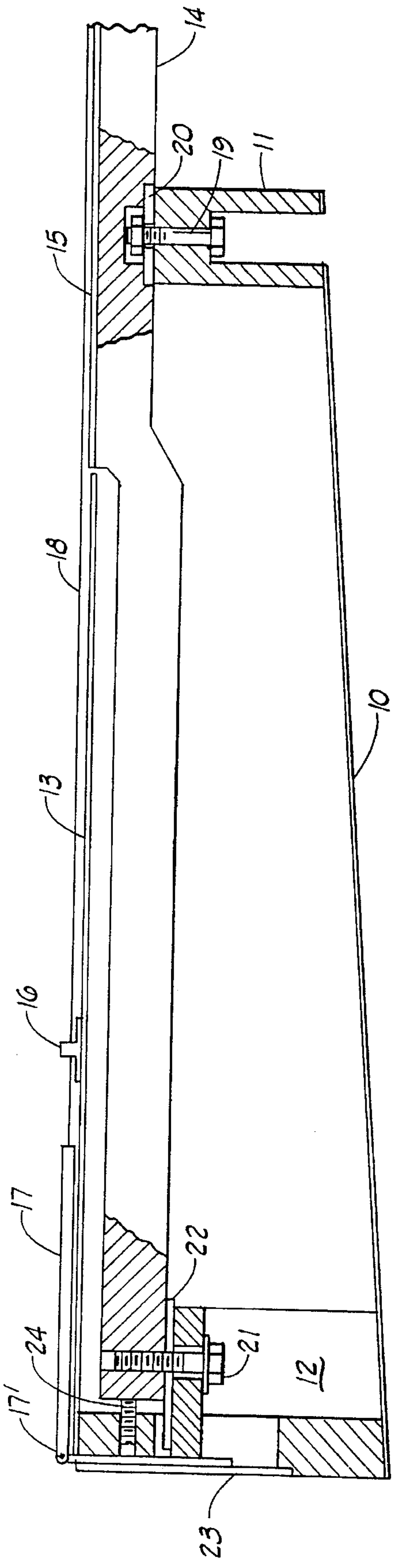
FIG. 1 is a cross sectioned side view of a guitar embodying the principles of the present invention showing, in particular, a neck construction including intonation and action adjustments. Only a portion of the neck is shown, and the portion shown is partially sectioned and broken to more clearly show the construction of the instrument.

The general constructional details of a guitar embodying the principles of the present invention can be seen by reference to FIG. 1, where a cross sectional side view of a guitar embodying such principles is illustrated. The body of the guitar shown in FIG. 1 can be seen to have a bottom 10, a heel block 11, a tail block 12, and a top 13. A neck 14, which extends out of the front of the guitar, is shown broken, the unseen portion to the right of the break being of conventional construction, i.e., including means for anchoring the front ends of the strings and for adjusting their tensions. A fingerboard 15 is located on the top surface of the neck. One embodiment of a "stress free" bridge assembly 16 is shown mounted on the top 13 ahead of the rear string anchor (tailpiece 17). The strings 18 are stretched between the head (located at the remote end of the neck) and tailpiece 17. A fret which is located at the head (the "nut", not shown), and the bridge assembly, define the free length of the strings, i.e., the vibrating portion. Intimate contact between the strings and their end supports (the nut, and/or the frets along the fingerboard, and the bridge assembly) is essential to assure fixed free lengths and consistent end conditions for the vibrating strings.

Constructional details of five embodiments of the invented bridge assembly are shown in FIGS. 5–8. The invented bridge assembly provides the desired fixed free length and consistent end conditions without putting stress on the guitar top. In each of these figures, for clarity and convenience, only two strings are shown. Guitars normally have six strings, of course, but illustrating two strings is believed adequate to convey the principles involved in the invention.

Figure 5:
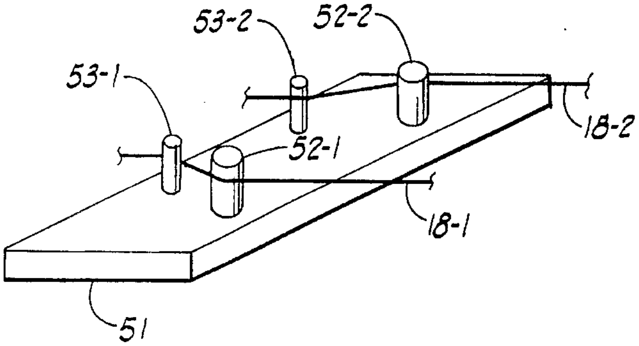
FIGS. 5, 6, 6A, 7 and 8 are perspective views of five different embodiments of a bridge assembly for the guitar of FIGS. 1–4.

In FIG. 5, a bridge assembly is shown having a base 51 which is intended to be glued or otherwise attached to the guitar top. The strings 18 (18-1 and 18-2 being shown) stretch between the nut and the tailpiece, and pass around pins 52 (the saddle pin) and 53 (the pressure pin). As can be seen, pins 52 and 53 are not set in line with the path of the strings, but are offset such that the strings partially bend around the pins. Also, the pins are set such that the string 18-1 bends in the opposite direction as compared to string 18-2. This is done so as to balance out at least most of the horizontal forces and couples created by the bends. In a guitar having six strings, three would bend in one direction, and the other three in the other direction. Since there is no vertical change in direction of the strings through the bridge assembly, there is no vertical component of force to be resisted. The location of the strings vertically on the pins is in the straight line between the tailpiece and the nut. As shown, the strings will naturally assume their position as described. If desired, however, either pins 52 or 53, or both may be provided with a circumferential groove in which the strings rest, and the pins threaded into the base 51 so that groove height can be adjusted as appropriate.

A modification of this embodiment of the bridge assembly (not illustrated) includes three pins in each set, two being in line with the undeflected path of the string between the nut and the tailpiece, and the third located between the first two, but offset so as to create a partial bend of the string around all three pins. With this arrangement, there would be no net force or couple which requires balancing.

Figure 6A:
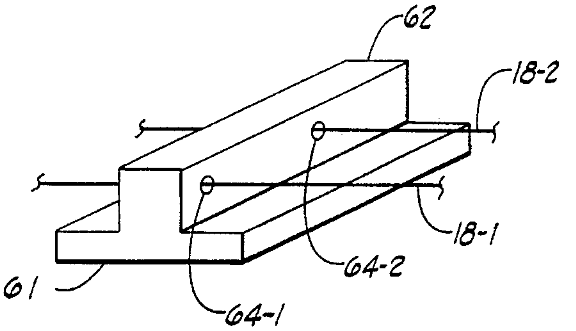
Figure 6:
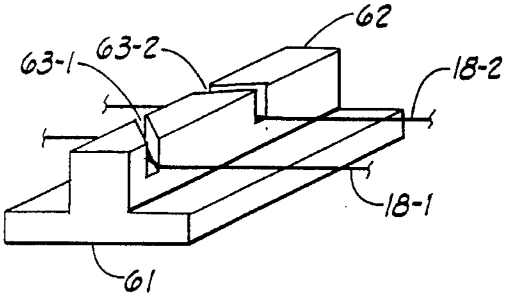

FIG. 6 illustrates a second embodiment of a bridge assembly. The brige assembly of this embodiment has a base 61 and a slotted saddle 62. The strings 18-1 and 18-2 in this embodiment are shown passing through angled slots 63-1 and 63-2. The slots are angled sufficiently that the strings are in intimate contact with one side of the slot as they enter the saddle, and the other side as they leave the saddle. Again, half of the slots are angled in one direction, and half in the other direction, balancing out substantially all of the horizontal forces and couples. If preferred, the slots, instead of being straight, as illustrated, could have a "vee" shape as they pass through the saddle 62. Such a construction would avoid any horizontal force or couple. Another variation of this embodiment involves the use of holes 64 instead of the slots 63. In this variation, the holes are angled through the saddle in the same way as are the slots illustrated in FIG. 6. The holes preferably pass through the saddle horizontally, i.e., both ends of the holes are at the same height above the bottom surface of the base 61, and are in line (vertically) with the undeflected path of the strings.

Figure 7:
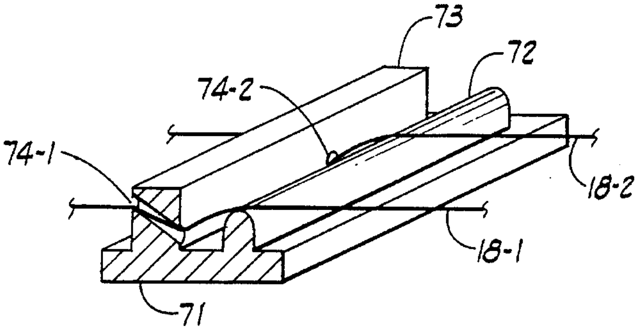

In FIG. 7, a bridge assembly is shown with a base 71, a front saddle 72, and a rear hold down 73. The strings pass over the top of the front saddle and through holes 74-1 and 74-2 in the rear hold down. The holes 74 are angled downward through the hold down 73 such that the bottom surface of the holes at the rear of the rear hold down is the same distance from the bottom of base 71 as is the top of front saddle 72, and the top surface of the holes at the front of hold down 73 is below the top surface of saddle 72. The top surface of saddle 72 and the bottom surface of the hole 74 as it emerges from the rear of hold down 73 should be substantially in line with the undeflected path of the string between the nut and the tailpiece. In this embodiment, there are no horizontal forces or couples to be balanced out.

Figure 8:
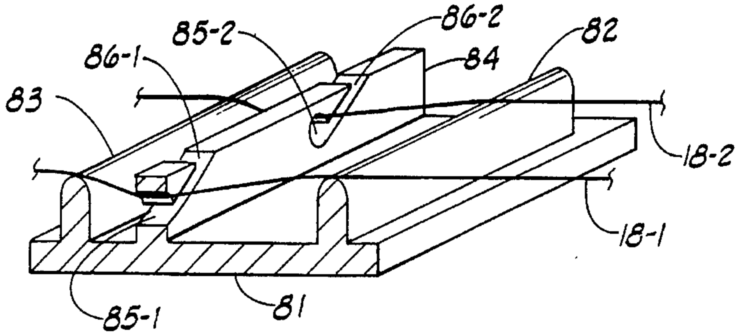

A final illustrative embodiment of the invented stress free bridge is shown in FIG. 8. In this embodiment, a front saddle 82 and a rear saddle 83, having the same height, project from base 81. As before, the saddle tops should be in line with the undeflected string path between the nut and the tailpiece. An intermediate hold down 84 projects from the base 81 between the front and rear saddles. Holes 85 which deflect the strings downward are formed in the hold down 84. Also slots 86 are provided to allow the strings to be put in place without the necessity of threading them through the holes 85. The top surface of holes 85 are below the line between the tops of the front and rear saddles so that the strings are pressed down onto the saddles.

Refer now back to FIG. 1 which illustrates the intonation and action adjustments of the present invention. The neck 14, to which retaining plate 20 is screwed, is fastened to the guitar body by bolt 19. The hole in plate 20 through which bolt 19 passes is elongated in the direction of the neck major axis, which allows the neck length to be varied as will be explained below. The neck, instead of ending near its point of connection with the front of the guitar as is conventional in the guitar art, extends through the guitar, and is fastened to the tail block 12 by bolt 21. A shim 22 is located between the tail block and the rear end of the neck 14, allowing adjustment of the vertical location of the rear end of the neck with respect to the guitar body. Varying the thickness of the shim 22 causes the neck to pivot about the front of the body where it is clamped by bolt 19. Pivoting the neck in this manner changes the spacing between the strings and the fingerboard 15, thereby providing an adjustment of the action of the guitar.

The position of the neck 14 in a lengthwise direction can be adjusted by screw 24. Turning screw 24 in (after loosening bolts 19 and 21) moves the head away from the bridge, increasing the length of the strings and thereby causing changes in intonation. A removable access plate 23 provides access to screw 24 and bolt 21 when adjustments are to be made.

In order to remove all stresses from the guitar top, not only should the bridge assembly not exert forces on the top, but the rear string anchor (tailpiece 17) should be mounted on something other than the guitar top. As shown in FIG. 1, tailpiece 17 is mounted to tail block 12 under access plate 23. The tailpiece is preferably made so that it can pivot vertically at its point of connection with the tail of the guitar (at 17'). With this construction, a plane including the pivot line 17' and the top of the nut will include the strings (except for the portions of the strings within the bridge).

Figure 4:
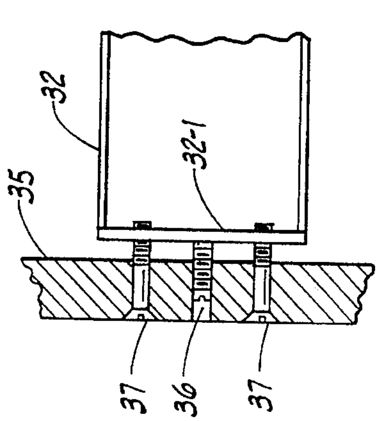
FIG. 4 is a fragmented section taken at 4—4 of FIG. 2.
Figure 3:
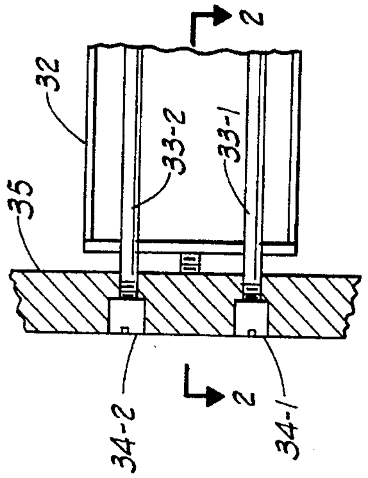
FIG. 3 is a fragmented section taken at 3—3 of FIG. 2.
Figure 2:
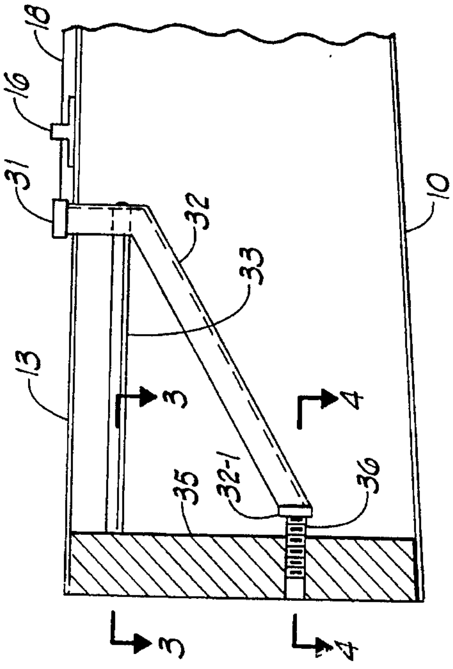
FIG. 2 is a fragmented side sectional view of a guitar according to the present invention showing an adjustable height tailpiece

FIGS. 2–4 illustrate a second tailpiece construction which, for the most part, is contained within the body of the guitar, and which has the added advantage of being adjustable in height. The tails of the strings 18 are anchored in tail anchor block 31, which is attached to an anchor strut 32. Anchor strut 32 projects through an opening in the guitar top, and is held by two tension screws 33-1 and 33-2, which, in turn are held to heel block 35 by nuts 34-1 and 34-2. The strut 32 preferably has the form of a "U" channel, but could have other constructions, if desired. The couple arising from the tension in the strings 18 and the resisting force of tension screws 33 results in a force which is resisted by set screw 36.which, in turn, bears against cross member 32-1 of strut 32. The tension screws 33 are made small enough in diameter, and are attached solidly to the strut 32, so that when set screw 36 is adjusted, the tension screws 33 bend, rather than the joint between them and strut 33 twisting. Hence, adjusting set screw 36 in or out will cause the height of tail anchor 31, and consequently the heights of the string tails, to vary. Screws 37, which are threaded into cross piece 32-1 are used to tighten the strut 32 against set screw 36 after the adjustment, and thereby secure the assembly.

For reasons of clarity, no neck extension is shown in FIGS. 2–4. If an extended neck is used with the tailpiece construction of FIGS. 2–4, the neck extension would most conveniently pass through an opening made in strut 32.

What has been described is a novel stringed musical instrument including a "stress free" bridge and intonation and action adjustments, among other features. Various modifications and adaptations of the invention will no doubt occur to persons skilled in the art, and these modifications and adaptions are intended to be covered by the attached claims.

We claim:

1. A bridge assembly for a stringed musical instrument, the instrument including a body, a neck extending from said body, and one or more strings, each of which extends over said body and said neck, and each of which is stretched between two anchor points, said bridge assembly being located between said anchor points, said bridge assembly comprising:

- a base having a bottom surface for attachment to a surface of said instrument;
- saddle means against which said one or more strings are held; and
- means attached to said base for holding said strings against said saddle means by changing the direction of said strings as said strings pass said saddle, each of said strings having a first point of contact and a last point of contact with said bridge assembly, said string being the same vertical distance from said bottom surface of said base at said first point of contact and said last point of contact.

2. A bridge assembly as recited in claim 1 wherein said saddle means comprises one or more first vertical surfaces extending from said base, and said means for holding said strings against said saddle means comprises one or more second vertical surfaces extending from said base, said second vertical surfaces being offset from said first vertical surfaces with respect to the lines between said anchor points whereby said strings are held against said saddle means and change direction as said strings pass said saddle means.

3. A bridge assembly as recited in claim 2 wherein said vertical surfaces are the surfaces of pins extending from said base.

4. A bridge assembly as recited in claim 1, wherein said saddle means comprises a member extending from said base, and wherein said means for holding said strings comprises a plurality of slots defined in said member, said slots being at an angle with respect to the lines between said anchor points.

5. A bridge assembly as recited in claim 1 wherein said saddle means comprises:

- a first surface parallel to said bottom surface of said base, said first surface being located on lines between said anchor points of said strings; and
- a second surface parallel to said bottom surface of said base, spaced from said first surface and at the same distance from the bottom of said base as said first surface, wherein said means for holding said strings against said saddle comprises:

- means attached to said base and located between said first and second surfaces for pressing said strings onto said first and second surfaces.

6. A bridge assembly as recited in claim 5 wherein said means for pressing said strings onto said first and second surfaces comprises a surface of an aperture in a member attached to said base and located between said first and second surfaces, said member comprising an intermediate hold down.

7. A bridge assembly as recited in claim 1 wherein said means for holding said strings against said saddle comprises a member attached to said base and spaced from said saddle, said member having one or more apertures therein, said strings passing through said apertures, a first surface of each of said apertures supporting a string at a distance from the bottom surface of said base the same as said string is supported from the bottom surface of said base by said saddle, and a second surface of said aperture supporting said string closer to the bottom surface of said base than said string is supported by said saddle.

8. A stringed musical instrument comprising:

- an instrument body, said body having a top;
- a neck extending from said body;
- a bridge attached to said top of said body; and
- a plurality of strings stretched over said body and said neck, said strings being anchored at one end to said body and at a second end to an end of said neck remote from said body, each individual string engaging said bridge at at least two contact points, said string applying a force to said bridge at said contact points so that intimate contact is maintained therebetween, wherein the forces applied by said strings are resisted and carried by said bridge, and are not transferred to said top of said body.

9. The musical instrument of claim 8, wherein said forces applied to said bridge are vertical forces.

10. The musical instrument of claim 8 wherein said forces applied to said bridge are lateral forces.

11. The musical instrument of claim 8 wherein for every force applied to said bridge by said strings, there is an equal and opposite force applied by said strings, the forces applied thereby being balanced so that there is no net force applied to said bridge and no pressure applied by said bridge to said top of said body.

12. The stringed musical instrument of claim 8 wherein said bridge comprises:

- a base, said base having a lower surface attached to said body top; and
- a saddle extending from said base, wherein at least one of said at least two contact points is defined on said saddle.

13. The musical instrument of claim 12 wherein the vertical distance between each individual string and said lower surface of said base does not vary as said string passes over said base.

14. The musical instrument of claim 13 wherein said saddle comprises a plurality of saddle pins extending from said base, said bridge further comprising a plurality of pressure pins extending from said base, one each of said plurality of pressure pins corresponding to one each of said plurality of saddle pins and being laterally offset therefrom, said at least two contact points comprising:

- a first contact point between said string and said saddle pin and a second contact point between said string and said corresponding pressure pin.

15. The musical instrument of claim 13 wherein said saddle comprises a member extending from said base, said member having a plurality of openings defined therein, and wherein one each of said plurality of strings passes through one each of said plurality of openings, said at least two contact points being defined by said opening.

16. The musical instrument of claim 15, wherein said openings comprise angled slots defined in said member extending from said base.

17. The musical instrument of claim 15, wherein said openings comprise holes defined in said member, said holes being vertically in line with the undeflected string path of the strings passing therethrough.

18. The musical instrument of claim 12, wherein said at least two contact points comprise a first contact point, an intermediate contact point and a last contact point, said first contact point and said last contact point being spaced vertically upward an equal distance from said lower surface of said base, said intermediate contact point being spaced vertically upward from said lower surface of said base a distance less than said distance from said lower surface of said base to said first and last contact points, said first and last contact points being the same vertical distance from the lower surface of said base as the undeflected string path.

19. The musical instrument of claim 18 wherein said saddle further comprises:

a front saddle extending from said base, said front saddle having a saddle top, said first contact points being defined on said front saddle top;

a rear saddle extending from said base, said rear saddle having a saddle top, said last contact points being defined on said rear saddle top; and an intermediate hold down projecting from said base between said front and rear saddles, said intermediate contact points being defined by a plurality of apertures in said intermediate hold down, said intermediate hold down having one each of said apertures for each string, said apertures being positioned below said saddle tops, wherein said strings pass through said apertures and said apertures press said strings onto said saddle tops.

* * * * *